United States Patent
Deynega et al.

(10) Patent No.: US 12,181,287 B2
(45) Date of Patent: Dec. 31, 2024

(54) SCANNABLE CODE BASED NAVIGATION IN AN INDOOR AREA

(71) Applicants: Evgeniy Deynega, Thornhill (CA); Paramvir Singh Nagpal, Brampton (CA); Saeedeh Hamidifar, Mississauga (CA)

(72) Inventors: Evgeniy Deynega, Thornhill (CA); Paramvir Singh Nagpal, Brampton (CA); Saeedeh Hamidifar, Mississauga (CA)

(73) Assignee: MAPSTED CORP., Oakville (CA)

( * ) Notice: Subject to any disclaimer, the term of this patent is extended or adjusted under 35 U.S.C. 154(b) by 298 days.

(21) Appl. No.: 17/680,693

(22) Filed: Feb. 25, 2022

(65) Prior Publication Data

US 2023/0273027 A1    Aug. 31, 2023

(51) Int. Cl.
*G01C 21/20*    (2006.01)
*G01C 21/00*    (2006.01)
*G06K 7/14*    (2006.01)

(52) U.S. Cl.
CPC ......... *G01C 21/206* (2013.01); *G01C 21/005* (2013.01); *G06K 7/1417* (2013.01)

(58) Field of Classification Search
CPC ... G01C 21/206; G01C 21/005; G06K 7/1417
See application file for complete search history.

(56) References Cited

U.S. PATENT DOCUMENTS

| | | | | |
|---|---|---|---|---|
| 10,567,212 B2 * | 2/2020 | Mouquet | ............... | H04L 65/613 |
| 11,528,327 B1 * | 12/2022 | Korepanov | ........... | H04L 67/141 |
| 2017/0284811 A1 * | 10/2017 | Liu | ......................... | H04W 4/30 |
| 2019/0234748 A1 * | 8/2019 | Chashper | ............. | G06Q 10/025 |
| 2019/0316911 A1 * | 10/2019 | Ohab | ....................... | H04W 4/80 |
| 2021/0027274 A1 * | 1/2021 | Mossoba | ............ | G06Q 20/0457 |
| 2021/0281977 A1 * | 9/2021 | Ebner | ................... | H04W 4/029 |

FOREIGN PATENT DOCUMENTS

| | | | | | |
|---|---|---|---|---|---|
| CN | 110207711 A | * | 9/2019 | ........... | G01C 21/206 |
| EP | 2093968 A1 | * | 8/2009 | ......... | H04L 65/1096 |

OTHER PUBLICATIONS

Machine Translation of CN110207711A (Year: 2019).*

* cited by examiner

*Primary Examiner* — Sahar Motazedi (57) ABSTRACT

A method and a device for scannable code based indoor navigation. In an example, via a first user device, a request for route information from a first location in the indoor area to a second location in the indoor area may be received. Further, a scannable code corresponding to a session established between the first user device and a server device may be generated. The scannable code may include information to enable mirroring of the session between the first user device and a server device to the second user device. When the scannable code is scanned by the second user device, the information pertaining to the session between the first user device and the server device may be provided to the second user device. Further, the second user device may be navigated in the indoor area, based on the route information associated with the session.

18 Claims, 3 Drawing Sheets

SCANNABLE CODE BASED NAVIGATION IN AN INDOOR AREA

TECHNICAL FIELD

The disclosure herein relates to the field of indoor navigation based localization of devices.

BACKGROUND

Location-based services are rapidly expanding as a ubiquitous service proposition. Outdoor location technologies are mainly based on GPS (Global Positioning System) technologies. At the same time, users of mobile devices have started to increasingly use and depend on indoor positioning and navigation applications and features. Particularly, indoor positioning and navigation of a mobile device carried or worn by a user can be difficult to achieve using satellite-based navigation systems, such as GPS, because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other computing devices, in conjunction with acquired wireless communication signal data to localize the mobile device. In certain cases, a user may wish to preplan an indoor route from a remote device, switch between multiple use devices, or share route with multiple users.

DETAILED DESCRIPTION

Among other benefits and technical effects, embodiments provided herein provide for a scannable code based indoor navigation. According to an aspect, the present subject matter involves generation and scanning of a scannable code to provide for navigating a user in an indoor area. The indoor facility or area may be for example, a shopping mall, an airport, a warehouse, a university, or any at least partially enclosed building.

Traditionally, the quick response code (QR) codes that were available for indoor navigation, are either associated with a landmark in the indoor facility or would be generated from kiosk available in an indoor facility. As a result, indoor route navigation was only available once the user was on site and preplanning the route from a remote location was not available. Further, the users were not able preplan the route from a remote location using a device other than the mobile device. For example, the users could not plan route from home or office using desktop, which may be easier for a user to browse from and then use the planned route on a portable device when traversing the indoor facility. Also, navigation could only be planned using a single device and switching between multiple user devices was not possible. Additionally, the options of circulating route information, including an indoor path to be traversed to reach a given destination, to multiple users at once are also limited. The user may also not have an option to monitor and guide these multiple users in real time.

Examples of the present subject matter are described herein which seek to address, inter alia, the above outlined deficiencies. The present invention provides a mechanism to share a desired indoor route with a user or a group of users locally or remotely. According to an aspect of present subject matter, a host server is configured to generate a unique scannable code for each session or communication channel that is established with a user device. The scannable code includes the information of the session, for instance, a web address to establish the session. When a user device, say, a first user device, such as user desktop/kiosk, requests for route information in an indoor area, the server may generate a scannable code. The scannable code may be generated as soon as a session is established between the first user device and the server or in response receiving request from the first user device. The server may provide scannable code to the first user device and the user may scan the scannable code provided to the first user device via a second user device, such as a mobile device of a user. When the scannable code is scanned, the session is established between the server and the second user device. In an example, the session established between the second user device mirrors the session that was established between the first user device and the server. This second user device can then access the desired route information through the web address embedded in the scannable code. Further, when the second user devices arrive at the indoor area, the server may navigate the second user device along an indoor route corresponding to the route information. This way, a user may be provided with flexibility to choose a device they wish to browse on and switch the devices as and when required.

In an example, the scannable code may be made shareable to allow the first user device to be able to share it with one or more second user devices. This way in case a route information is to be shared with multiple people, it may be shared via the QR code. For instance, for a group of friends meeting in a mall, a common destination may be selected and a scannable code may be generated having the desired route information. Now, as the group via their portable devices scan the code, they may be provided the route information. Further, one of the users, for instance, the one who requested generation of the scannable code may be provided real-time updates pertaining to a current location of each of the portable devices for monitoring and/or assisting in navigation in the indoor area. Likewise, a family may share it with its members and one of the members may also monitor and guide the other family members in the indoor area.

Also provided herein is a computing device including a processor and a memory. In both, the instructions are executable in the processor to render indoor-location based services as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame. In other examples, other forms of coordinates, such as spherical coordinates or polar coordinates may be used for spatially indicating the locations, as envisaged in the present subject matter.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable mobile devices, and tablet mobile devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage mobile devices, such as hard drives on personal computers or servers. Other examples of computer storage mediums include portable memory storage units, flash memory (such as carried on smartphones, multifunctional mobile devices or tablets), and magnetic memory. Computers, terminals, network enabled mobile devices (e.g., mobile devices, such as cell phones) are all examples of machines and mobile devices that utilize processors, memory, and instructions stored on computer-readable mediums. Additionally, embodiments may be implemented in the form of computer-programs, or a computer usable carrier medium capable of carrying such a program.

System Description

Figure 1:
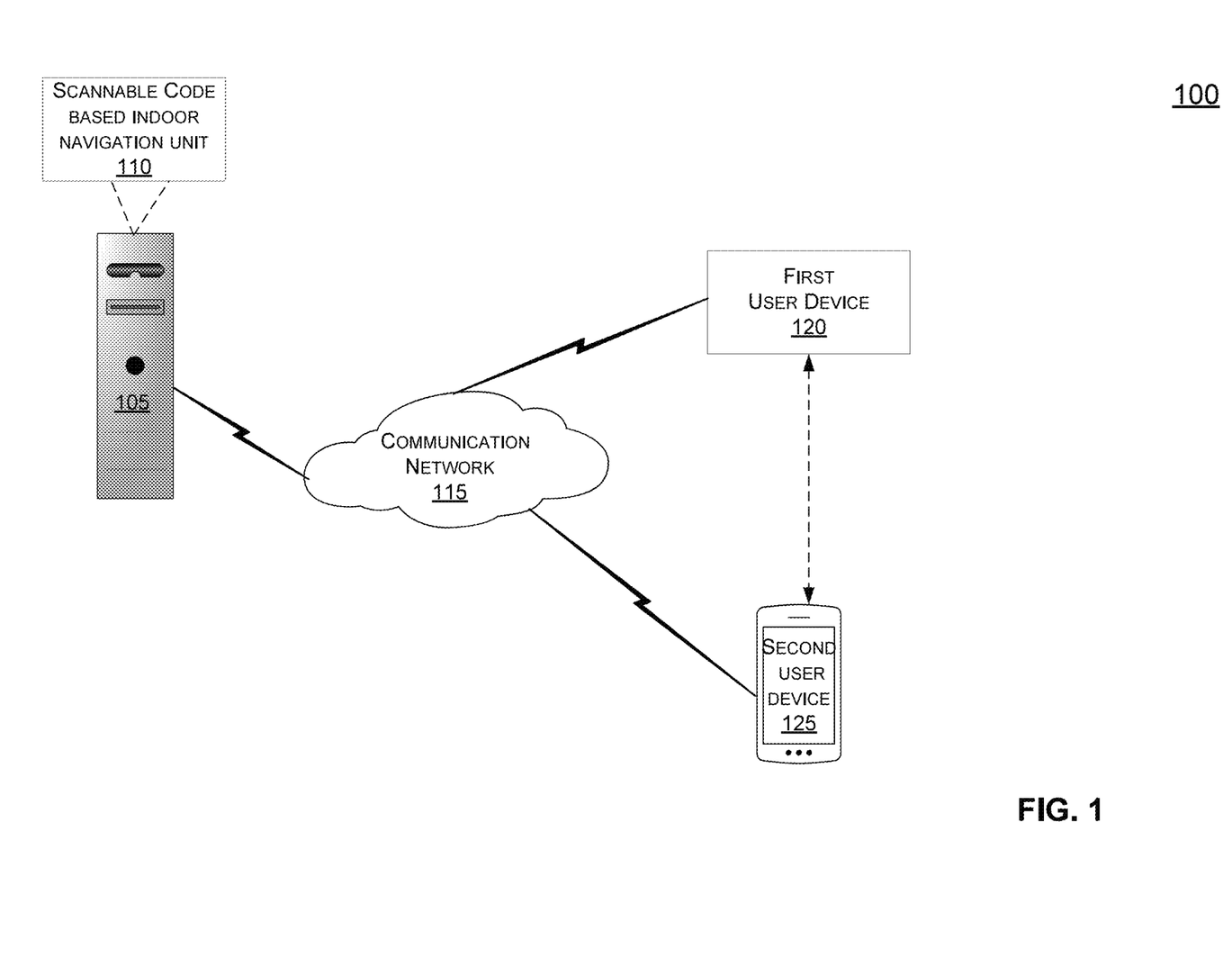
FIG. 1 illustrates, in an example embodiment, a network environment for scannable code based indoor navigation.

FIG. 1 illustrates, in an example embodiment, a network environment 100 for a scannable code based indoor navigation. The network environment includes a server device 105, having a scannable code based indoor navigation unit 110 for providing navigation in an indoor space. The indoor space may include airports, malls, parking garages, warehouses, and any similar indoor facility. The server device 105 is communicatively connected via a communication network 115 to user devices 120, 125. The server device 105, interchangeably referred to as server 105, may be a computing device, such as a cloud server or a remote server.

The user devices 120, 125 include a first user device 120 and a second user device 125. The first user device 120 may be any computing device, such as a laptop, a desktop computer, a kiosk or any other computing device. The second user device 125 can be any portable device, such as mobile devices, tablets, or smart phones, having a plurality of sensors including inertial sensors and signal sensors. For instance, inertial sensors may include accelerometer, gyroscope, barometer, and other sensors having magnetic field sensing functionality and/or environmental pressure sensing functionality. Similarly, in said example, the signal sensors may include sensors capable of detecting and measuring Bluetooth, Wi-Fi, RFID, and GPS signals The communication network 115, in an example, may be a wireless communication network, such as, a telecommunication network, a cellular network, a wireless local area network (WLAN), a satellite communication-based network, a near field communication-based network, etc.

In operation, the server 105 can facilitate in the localization of the second user device 125 in an indoor area. In an example, a user may wish to preplan their route inside an indoor area or may wish to get the route information prior to being in the indoor area. For example, the user may wish to cover multiple locations in the indoor area and may plan a route so as to efficiently use the time. Consider a case where a user wishes to visit a mall, in said case, a user may wish to visit multiple stores in the mall and may plan ahead a shortest route or route based on priority. In other examples, some users simply prefer browsing and getting information on a larger screen device, such as a desktop or a laptop. The first user device 120, in an example, may be a computing device external to the indoor area. For instance, a user may wish to obtain route information from a remote location, such as their office or home via a computing device, such as a laptop or desktop. In another example, the first user device 120 may be a kiosk in the indoor area.

The first user device 120 may select an indoor area of interest. In response to selection, the sever 105 may provide an indoor map of the indoor area to the first user device 120. The indoor map may indicate various units on each floor level of the indoor area, paths, exits and entrances, elevators, stairs and other structural features. The first user device 120 may request to provide route information from a first location in the indoor area to a second location in the indoor area. Further, the scannable code based (SCB) indoor navigation unit 110 of the server 105 may generate a scannable code corresponding to a session established between the server 105 and the first user device 120. In an example, the scannable code may be generated when a session is established between the server 105 and the first user device 120. In other example, the scannable code may be generated in response to the request. The scannable code may have a web address or a URL corresponding to the session embedded therein. The scannable code may allow mirroring of the session between the first user device 120 and the server 105 to another user device, such as the second user device 125. The scannable code may be unique for each session.

The SCB indoor navigation unit 110 may provide the scannable code to the first user device 120. The first user device 120 may continue to work on an indoor route within the indoor area. Once the user is done planning the route, the user may scan the scannable code provided to the first user device 120 via the second user device 125 so that information pertaining to the session and thus the route is available to the second user device 125. The second user device 125 may, for instance, perform scanning using a camera or a near field communication technology. In response to scanning of the scannable code by the second user device 125, the SCB indoor navigation unit 110 may provide the information associated with the session corresponding to the scannable code to the second mobile device 125. For instance, if the user via the first user device 120 planned a route between a first location A and a second location B in the indoor area, the route may be provided on a display unit of the second user device 125.

The user on reaching the indoor area via the second user device 125 may initiate indoor navigation along the indoor route corresponding to the scannable code. The SCB indoor navigation unit 110 may then navigate the second user device 125 along the indoor route, for instance, to navigate the user from the first location to the second location. To enable localization, the second user device 125 may share localization data with the server 105. The localization data may include location details, such as location (x, y) coordinate information and floor number information, such as for a multi-floor building constituting the indoor area and/or sensorial data (signal and/or sensor) used for localization. In other examples, other forms of coordinates, such as spherical coordinates or polar coordinates may be used for spatially indicating the locations, as envisaged in the present subject matter. The position of the second user device 125, i.e., localization, may be estimated either by the second user device 125 itself or by the server 105.

The second user device 125 may be a cellular or smartphone, a laptop or a tablet computer, or a wearable computer mobile device that may be operational for any one or more of telephony, data communication, and data computing. The second user device 125 may include or be able to access fingerprint data of the indoor area, such as an indoor facility and proximate pedestrian section stored in a local memory. In some examples, the second user device 125, may download the fingerprint data from the server 105. The fingerprint data along with the sensorial data (sensor data and/or signal data) obtained by the second user device 125 may be used for localization.

The terms fingerprint and fingerprint data as used herein refer as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by the second user device 125, the value or pattern as detected may be matched to a reference fingerprint stored in a fingerprint map of a given facility, for example as stored in positioning fingerprint data repository, to identify the unique position of the second user device 125 to the facility, a process also referred to herein as localization.

The second user device 125 may include sensor functionality by way of sensor mobile devices. The sensor mobile devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. In an example, the second user device 125 may, periodically or on receiving an input from the server computing device 105, localize the second user device 125, i.e., itself. As mentioned before, a localizer, constituted of logic instructions executable in a processor of the user device in one embodiment, may be hosted at the second user device 125 and provides, at least in part, capability for system localizing the second user device 125 along an indoor route traversed in an indoor space. In alternate embodiments, one or more portions constituting the localizer may be hosted remotely at a server device, such as the server 105, and made communicatively accessible to second user device 125 via the first communication network 115-1.

Thus, based on the fingerprint data and localization data, the SCB unit 110 may determine a current location of the second user device 125 in the indoor area. The current location may be provided or displayed on the indoor map to the second user device 125. As the second user device 125 traverses the indoor route, the SCB unit 110 may accordingly navigate a user to the second location, i.e., destination. This way, a user may be able to preplan their route prior to being in the indoor area and may seamlessly switching between multiple devices. Once arrived in the indoor area, the user may be navigated along the planned indoor route. Additionally, in case of any detours, the user may still be navigated to desired destination(s).

Figure 2:
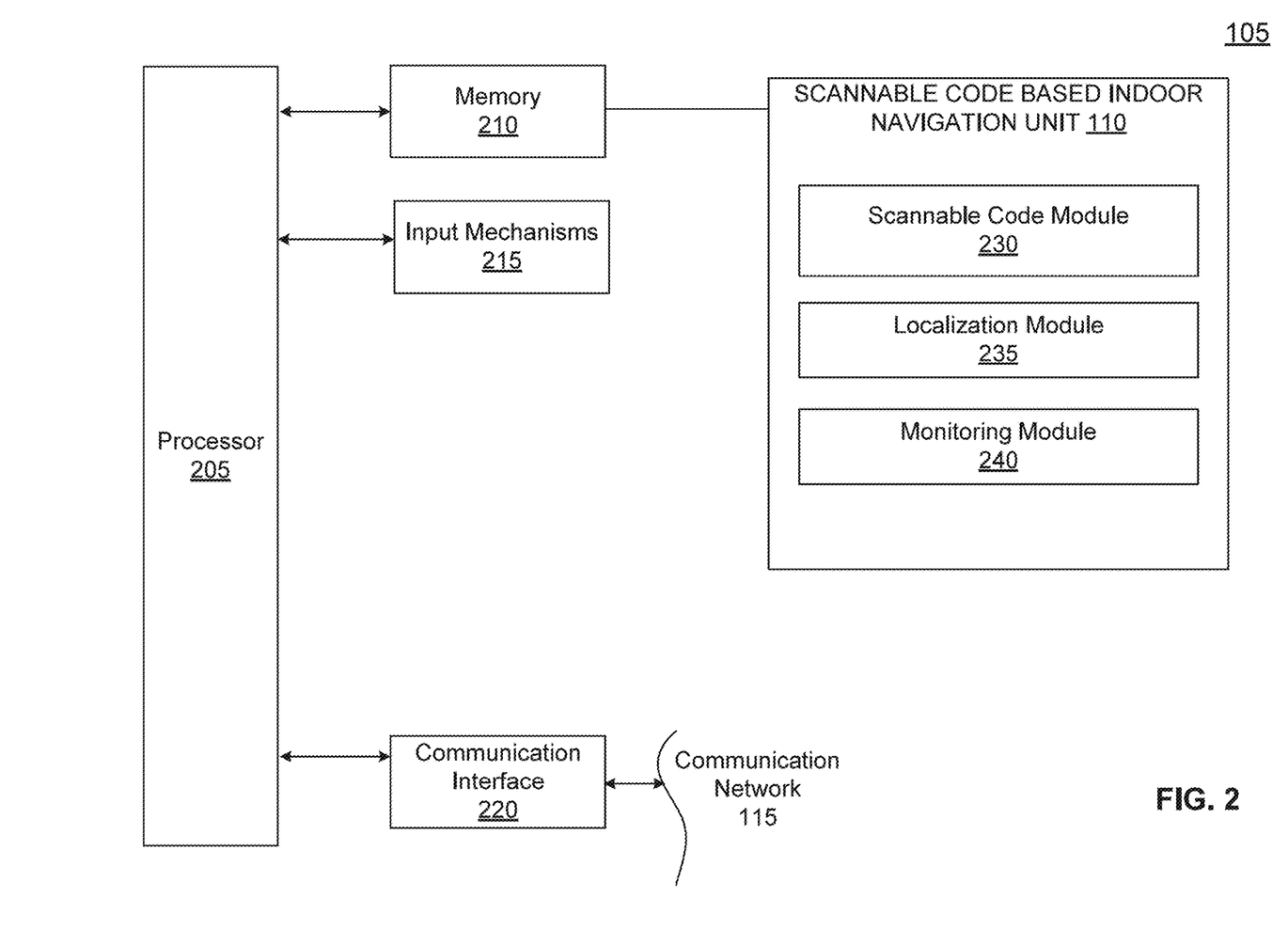
FIG. 2 illustrates, in one example embodiment, an architecture of a server device implementing a scannable code based indoor navigation system for mobile device indoor navigation and positioning.

FIG. 2 illustrates an example architecture of the server 105 for scannable code based indoor navigation. The server 105, in an embodiment architecture, may be implemented on one or more server devices, and includes a processor 205, memory 210 which may include a read-only memory (ROM) as well as a random access memory (RAM) or other dynamic storage device, input mechanisms 215 and communication interface 220 for communicative coupling to communication network 115. The processor 205 is configured with software and/or other logic to perform one or more processes, steps and other functions described with implementations, such as described by FIG. 1 and FIG. 3 herein. The processor 205 may process information and instructions stored in the memory 210, such as provided by a random-access memory (RAM) or other dynamic storage device, for storing information and instructions which are executable by the processor 205. The memory 210 also may be used for storing temporary variables or other intermediate information during execution of instructions to be executed by the processor 205. The memory 210 may also include the ROM or other static storage device for storing static information and instructions for processor 205; a storage device, such as a magnetic disk or optical disk, may be provided for storing information and instructions. Communication interface 220 enables the server 105 to communicate with one or more communication networks, such as the network 115 (e.g., cellular network) through use of the network link (wireless or wired). Using the network link, the server 105 can communicate with the user devices 120, 125.

The server 105, among other components, may include the scannable code based indoor navigation unit 110. The scannable code based indoor navigation unit 110 may include processor-executable instructions stored in RAM, in one embodiment, in the memory 210 and may include sub-modules for carrying out various operations and functions. The SCB indoor navigation unit 110 includes a scannable code module 230, a localization module 235, and a monitoring module 240.

The server 105 facilitates localization of mobile devices in indoor areas. As explained earlier, the first user device 120 may select an indoor area that they wish to visit. Based on the selection, the scannable code module 230 may provide facility information pertaining to the indoor area. The facility information may be, for instance, an indoor map showing various features, such as facility units, hallways, elevators, and stairs. In other examples, the facility information may be a directory providing a list of locations/facility units. It will be appreciated that the facility information may be provided in any form that may allow a user to select a start location and a destination.

The first user device 120 may request to access route information between two or more locations in the indoor area. For instance, the first user device may wish to determine route from a particular entrance to a shop inside in a mall or to particular ward inside a hospital. In other examples, the user may add multiple locations along a route to be traversed. Upon receiving the request, the scannable code module 230 may provide a scannable code for a session established between the server 105 and the first user device 120 to the first user device 120. As mention earlier, the scannable code may be generated automatically as soon as a session is established between the server 105 and the first user device 120 or on receiving a request from the first user device 120.

The scannable code is a digital code that can be scanned or accessed by another user device to obtain information associated with the digital code. The scannable code module 230 may implement an appropriate technique to generate the scannable code. In an example, the scannable code may be a QR code and the scannable code module 230 may implement a QR code generation technique for generating the QR code.

The scannable code may be embedded a with web address in form of a URL so that the session that was between the first user device 120 and the server 120 can be established between any other user device and the server 105. In an example, the web address may be for the format https://abc.com/channelID, where abc corresponds to server 105 and the channel ID is an ID unique to each session established between the server 105 and the first user device 120. The channel ID allows for establishing the same session that was between the first user device 120 and the server 105 on the second user device 125. In addition to the web address, the scannable code may also include one or more of metadata, history data, route information, and georeferencing information, such as latitude/longitude information.

The history data includes user specific data, such as past searches, previous interactions with the server 105, and user preferences pertaining to navigation, for instance, if a user is to be provided with accessibility routes, routes with escalators, routes with peoples with specific needs, such as handicap or with a baby. The history data may provide for suggesting most efficient and comfortable indoor route for the user corresponding to the route information. Also, since the information is associated with the second user device 125 (on scanning the scannable code, the second user device 125 may also be navigated in a desired manner.

The route information may include a start location and an end location or user itinerary, or just the end location (destination). The geo-referencing information may include geo-reference information pertaining to a point of interest in the indoor area, for instance, a start location, a destination, or a specific landmark. Such geo-referencing information may be customizable by the user.

The scannable code module 230 may provide the generated scannable code to the first user device 120, which in turn may make the scannable code accessible to other devices, such as the second user device 125. When the user of first user device 120 is ready, the user may scan the scannable code from the second user device 125. For instance, a user working out of his office may wish to pre plan a route in an indoor area using a desktop as the first user device 120; once done with the planning or in case user wishes to switch the device, the user may use his smartphone as the second user device 125 to scan the scannable code and continue route planning and/or use the route information using the smartphone.

In response to the second user device 125 scanning the scannable code, the scannable code module 230 determines the channel ID corresponding to the scannable code and establishes the corresponding session between the second user device 125 and the server 105. Once the session is established, the user may interact with the server 105 via the second user device 125 or the first user device 120, if it is still connected. In an example, the user on reaching the indoor area to be traversed, may initiate the route navigation. For instance, the user may open the webpage/app with the route information associated with the scannable code. The localization module 235 of the server 105 may provide for localizing and navigating the user as the second user device 125 traverses the indoor area.

The localization module 235 may receive localization data, such as sensorial data or location coordinates, pertaining to a current location of the second mobile device 125 from the second mobile device 125. Based on the localization data, the localization module 235 may localize the mobile device in the indoor area as explained earlier. In an example, as the user moves, corresponding position of the user may be updated in real-time and displayed on the second user device 125. This way, the localization module 235 may navigate the second user device 235 along an indoor route as indicated by the route information associated with the scannable code. In case of detour, the second user device 125 may be shown other routes to reach a given location.

In other examples, the first user device 120 may wish to share the scannable code with multiple devices, referred to as plurality of user devices, such as the second user device 125. In said example, the scannable code module 230 may provide a provision of sharing the scannable code. The first user device 120 may use such a provision in case a location is to be shared with multiple users and/or the user are to be monitored or navigated in real-time. Accordingly, once the scannable code is received by the first user device 120, in said example, the first user device 120 may share the scannable code via any platform, such as an email, a text message, an instant message, or via any application that provides sharing of the scannable code, with the second user devices. In other example, on receiving input from the first user device 120, the scannable code module 230 may share the scannable codes with the plurality of second user devices 125. On receiving the scannable code, the second user device 125 may scan the scannable code to establish a session with the server 105. Since, the scannable code is corresponding to the session generated by the first user device 120, the second user devices 125 may be able access the route information, such as route to a designated destination.

As explained previously, as each of the second user devices 125 traverses an indoor route associated with the route information, the localization module 230 may localize each of the second user devices. Further, the monitoring module 240 may provide real-time updates pertaining to a current location of each of the second user devices in the indoor area to the first user device. In an example, the monitoring module 240 may display a current location of the second user devices 125 to the first user device 120. Thus, said embodiment provides for sharing of a pre-planned route with a set of users and if required, the first user device 120 may also monitor these second user devices 125 to help them navigate in the indoor area.

In another example, a personalized message may also be added while generating the scannable code. For example, the first user device 120 may indicate a message to be displayed every time the scannable code corresponding to the session is scanned/accessed by any other device. In case the scannable code is shared with multiple devices, the personalized message may indicate a meeting spot and/or time so that all the participants know where/when to meet. Likewise, based on need, the personalized message may be customized. In said example, the first user device 120 may provide information regarding the message, for instance, the message as such or data for placeholders in a template message. The scannable code module 230 may associate this message with the scannable associated with the current session with the first user device 120. As a result, when the scannable code is scanned by other devices, such as the second user device 125, along with the session being mirrored, the message is also provided and displayed on the second user device 125.

Methodology

Figure 3:
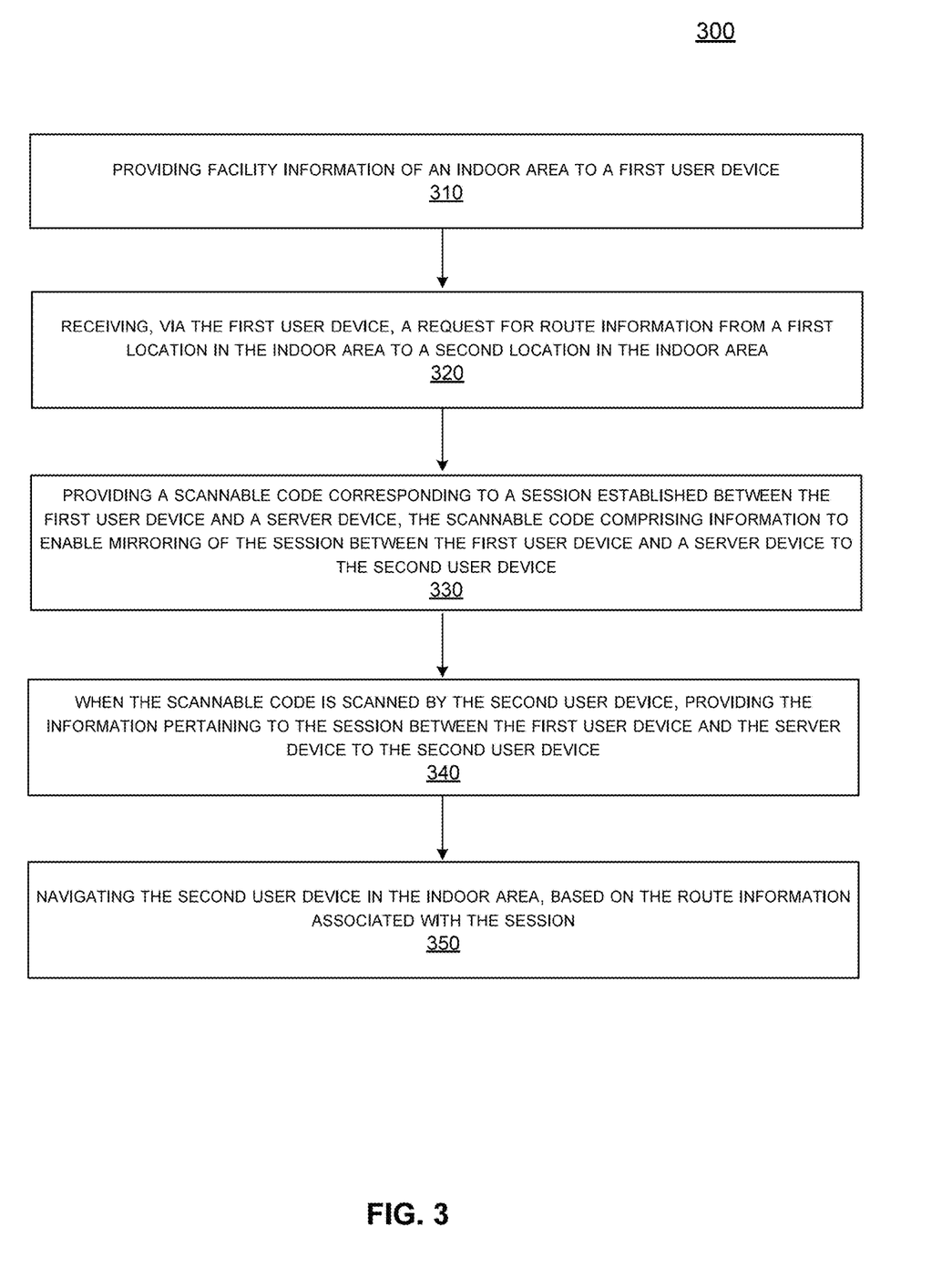
FIG. 3 illustrates, in an example embodiment, a method of a scannable code based indoor navigation.

FIG. 3 illustrates, as an example, a method 300 of localizing a mobile device in an indoor space using grid-based representation of map constraints. In describing examples of FIG. 3, reference is made to the examples of FIGS. 1-2 for purposes of illustrating suitable components or elements for performing a step or sub-step being described. For the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 3 examples of method steps described herein are related to a server, such as the server 105, to facilitate scannable code based indoor navigation of mobile devices, such as the second user device 125. According to one embodiment, the techniques are performed by the processor 205 executing one or more sequences of software logic instructions that constitute the scannable code based indoor navigation unit 110 of the server 105. In embodiments, scannable code based indoor navigation unit 110 may include the one or more sequences of instructions within sub-modules. Such instructions may be read into the memory 210 from machine-readable medium, such as memory storage mobile devices. Execution of the sequences of instructions contained in the scannable code based indoor navigation unit 110 in the memory 210 causes the processor 205 to perform the process steps described herein. It is contemplated that, in some implementations, some of the sub-modules, or any other portions of executable instructions constituting the plan generator 160 may be hosted at a remote device other than at the server 105. In alternative implementations, at least some hard-wired circuitry may be used in place of, or in combination with, the software logic instructions to implement examples described herein. Thus, the examples described herein are not limited to any particular combination of hardware circuitry and software instructions.

At block 310, facility information of an indoor area may be provided to the first user device 120. For example, the facility information may include an indoor map or a directory listing all the facility units in the indoor area.

At block 320, a request to provide route information from a first location, such as a start location, in the indoor area to a second location, such as an end location, in the indoor area may received from a first user device 120. For instance, a user may select facility units/entries/exits on a digital map or on a directory.

At block 330, a scannable code corresponding to a session established between the first user device 120 and the server 105 may be provided to the first user device. The scannable code may include information to enable mirroring of the session between the first user device and a server device to another user device, such as the second user device. The scannable code may include, for example, a QR code, snaptags, or any other code that may allow for establishing of session between a server and a user device. In an example, the scannable code comprises a web address corresponding to the session between the first user device and the server device, and wherein the scannable code includes a session ID unique to each session established between the server device and the first user device. Further, the scannable code may include metadata, history data, route information, and latitude-longitude information.

At block 340, when the scannable code is scanned by the second user device, the information pertaining to the session between the first user device and the server device is provided to the second user device. The scannable code when scanned may provide to the second user device, the information that is shared between the first user device 120 and the server 105. This way, the route that is planned on the first user device 120 can be accessed by the second user device 125. Since, the session is also established between the second user device 125 and the server 105, the second user device 125 may also be able to edit information to get desired route information.

At block 350, the second user device in the indoor area may be navigated in the indoor area, based on the route information associated with the session. In an example, the server may receive localization data, such as location coordinates and/or sensorial data, pertaining to a current location of the second user device from the second user device. Based on the localization data, the second user device may be localized in the indoor, thereby navigating the second user device 125 in the indoor area. Thus, the present subject matter provides the flexibility to seamlessly switch between multiple devices. Further, such switching, allows a user to pre-plan a route on any device and not be restricted by mobile device only.

In an example, the first user device is external to the indoor area and the second user device is a mobile device, which may traverse the indoor area. In the other examples, the first user device may internal to the indoor area, for example, the first user device may be a kiosk or any other interactive computing device, which allows a user to interact with the server 105.

In other examples, a message to be associated with the scannable code may be received from the first user device 120. Further, the server 105 may associate the message with the scannable code. In response to scanning of the scannable code by the second user device, the message is provided to the second user device 125. Thus, along with the information for establishing the session with the server 105, the message is shared with the second user device 125.

In another example, the scannable code is shared with a plurality of user devices, the plurality of user devices including at least the second user device 125. Further, the plurality of user devices may be navigated in the indoor area along an indoor route corresponding to the route information. Real-time navigation information of the plurality of user devices may also be shared with the first user device 120 to allow the first user device 120 to monitor a movement of the plurality of user devices in the indoor area. For instance, the first user device 120 may guide various users to reach a destination.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method comprising:
   receiving, by a server device and via a first user device, a request to provide route information from a first location in an indoor area to a second location in the indoor area, wherein the first user device is external to the indoor area and the first user device is a personal use computing device;
   in response to the request, providing, by the server device, a scannable code corresponding to a session established between the first user device and the server device, the scannable code comprising (i) information to enable mirroring of the session between the first user device and the server device to a second user device, and (ii) the route information corresponding to the session;
   when the scannable code is scanned by the second user device, determining, by the server device, a channel ID associated with the scannable code;
   based on the channel ID, mirroring, by the server device, the session between the first user device and the server device to the second user device and the server device by establishing, on the second user device, the same session that was established between the first user device and the server device;
   based on receiving a route navigation request from the second user device, obtaining, by the server device, localization data from the second user device;
   determining, by the server device, a current location of the second user device in the indoor area, based on the localization data;
   navigating, by the server device, the second user device in the indoor area from the current location to the second location, based on the route information associated with the session between the second user device and the server device.

2. The method of claim 1, wherein the scannable code further comprises a web address corresponding to the session between the first user device and the server device, and wherein the scannable code includes the channel ID unique to each session established between the server device and the first user device.

3. The method of claim 1, wherein the scannable code further includes at least one of metadata, history data, and geo-referencing information.

4. The method of claim 1, wherein the second user device is a mobile device.

5. The method of claim 1, further comprising:
   receiving a message to be associated with the scannable code from the first user device;
   associating the message with the scannable code; and
   in response to scanning of the scannable code by the second user device, providing the message to the second user device.

6. The method of claim 1, further comprising: sending the scannable code to a plurality of user devices, the plurality of user devices including at least the second user device.

7. The method of claim 6, further comprising: navigating the plurality of user devices in the indoor area along an indoor route corresponding to the route information.

8. The method of claim 7, further comprising: providing real-time navigation information of the plurality of user devices to the first user device to allow the first user device to monitor a movement of the plurality of user devices in the indoor area.

9. The method of claim 1, wherein the scannable code is a quick response (QR) code.

10. A server device comprising:
    a processor; and
    a memory storing a set of instructions, the instructions executable by the processor to:
    receive, via a first user device, a request to provide route information from a first location in an indoor area to a second location in the indoor area, wherein the first user device is external to the indoor area and the first user device is a personal use computing device;
    in response to the request, provide a scannable code corresponding to a session established between the first user device and the server device to the first user device, the scannable code comprising (i) information to enable mirroring of the session between the first user device and the server device to a second user device, and (ii) the route information corresponding to the session;

when the scannable code is scanned by the second user device, determine a channel ID associated with the scannable code;

based on the channel ID, mirror the session between the first user device and the server device to the second user device and the server device by establishing, on the second user device, the same session that was established between the first user device and the server device;

based on receiving a route navigation request from the second user device, obtain localization data from the second user device;

determine a current location of the second user device in the indoor area, based on the localization data; and navigate the second user device in the indoor area from the current location to the second location, based on the route information associated with the session between the second user device and the server device.

11. The server device of claim 10, wherein the scannable code further comprises a web address corresponding to the session between the first user device and the server device, and wherein the scannable code includes the channel ID unique to each session established between the server device and the first user device.

12. The server device of claim 10, wherein the scannable code further includes at least one of metadata, history data, and geo-referencing information.

13. The method of claim 10, wherein the second user device is a mobile device.

14. The server device of claim 10, wherein the memory further stores instructions executable by the processor to:
   receive a message to be associated with the scannable code from the first user device;
   associate the message with the scannable code; and
   in response to scanning of the scannable code by the second user device, provide the message to the second user device.

15. The server device of claim 10, wherein the memory further stores instructions executable by the processor to send the scannable code to a plurality of user devices, the plurality of user devices including at least the second user device.

16. The server device of claim 15, wherein the memory further stores instructions executable by the processor to navigate the plurality of user devices in the indoor area along an indoor route corresponding to the route information.

17. The server device of claim 16, wherein the memory further stores instructions executable by the processor to provide real-time navigation information of the plurality of user devices to the first user device to allow the first user device to monitor a movement of the plurality of user devices in the indoor area.

18. The server device of claim 10, wherein the scannable code is a quick response (QR) code.

* * * * *